Figure 1:
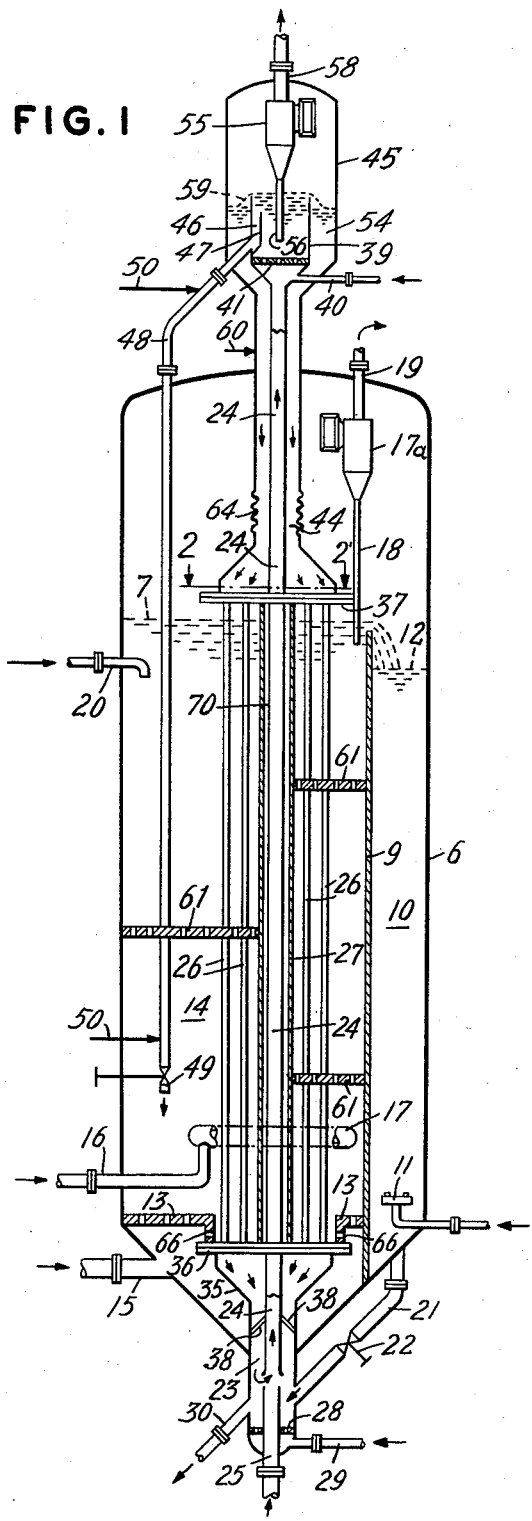

Dec. 23, 1958   W. J. DEGNEN   2,865,846
FLUID SYSTEM FOR USE IN CONVERSION AND
REFORMING OF HYDROCARBONS
Filed July 30, 1951

INVENTOR.
WILLIAM J. DEGNEN
BY E. F. Liebrecht
   G. H. Palmer
   T. C. Virgil
      ATTORNEYS though of the sorts of finely divided particles. Still more particularly, this invention is concerned with transferring heat from the regeneration zone to the reaction zone in a hydrocarbon conversion process.
United States Patent Office

2,865,846
Patented Dec. 23, 1958

2,865,846

FLUID SYSTEM FOR USE IN CONVERSION AND REFORMING OF HYDROCARBONS

William J. Degnen, Westfield, N. J., assignor to M. W. Kellogg Company, Jersey City, N. J., a corporation of Delaware Application July 30, 1951, Serial No. 239,320

15 Claims. (Cl. 208—147)

This invention relates to improvements in systems handling fluidized solids, and more particularly pertains to a novel method and means for effecting the transfer of heat between two fluidized masses of finely divided particles. Still more particularly, this invention is concerned with transferring heat from the regeneration zone to the reaction zone in a hydrocarbon conversion process.

Under the present invention, methods and means are provided for economically and efficiently transferring heat from one mass of finely divided solids to another. My invention is applicable for hydrocarbon conversion, e. g., hydroforming, cracking under hydrogen pressure, fluid catalytic cracking, etc.; hydrogenation of carbon oxides; desulphurization; the distillation of powdered coal; etc.

In accordance with the present invention, effective transfer of heat between masses of finely divided solids is accomplished by passing finely divided solids upwardly in a confined elongated zone, imparting heat to the solids, and then passing the heated solids downwardly in at least one separate confined elongated zone which indirectly contacts the mass of finely divided solids to be heated.

Another aspect of the present invention is to provide safe heating of a mass of finely divided solids by passing another mass of finely divided solids upwardly in an elongated confined zone, imparting heat to the solids, and then passing at least a portion of said heated solids downwardly in a separate elongated confined zone surrounding the aforesaid elongated confined zone and which indirectly contacts the solids to be heated.

The apparatus and process of this invention can be used for a variety of situations in which the heat is to be transferred from one mass of finely divided solids to another without direct contact. Finely divided solids are capable of behaving as a fluid when aerated with a gas or vapor at velocities sufficient to maintain the particles suspended, hence they can flow, and exert a fluistatic pressure, etc. For the purposes herein, the finely divided solids should be of such size that gasiform materials will carry the same in an upward direction of travel as a lean or dense suspension. Generally, solids of about 0 to 200 microns or more can be lifted or carried in a gaseous stream in the range of superficial gas velocities considered for this process. For the purposes of this invention, it should be understood that by the term "gas" it is intended to cover materials which are normally gases and/or vapors of materials which are normally liquid under standard conditions. The gases employed to lift or carry the solids should have a superficial linear velocity sufficient for this purpose. Generally speaking, carrying velocities for solids of the sizes mentioned above are in the order of about 5 to 100 feet per second. As previously mentioned, under the above described conditions, the finely divided solids can be present as either a high or low concentration in the lifting gases, or more commonly referred to as a dense or lean phase of solids. The particle density is also a factor to be considered in the matter of solids flowing in an upward direction. However, this property will vary with the kind of solids used, and so to maintain a certain flow rate, any increase in particle density will need to be compensated for by an increase in linear gas velocity; or vice versa, any decrease in particle density will be adjusted by lowering the linear gas velocity.

The elongated confined zone wherein finely divided solids are carried upward may serve as a means for generating heat for later indirect exchange with the mass of solids to be heated. In this respect, heat is produced by burning a combustible material which is deposited on the non-combustible solids, or by burning solids which are composed of combustible material, and/or by a combination of the foregoing. To produce burning, an oxygen-containing gas is employed, which also serves the purpose of carrying the solids upward; or alternatively, the amount of oxygen-containing gas may only be enough to generate the desired heat and additional inert gases are used to assist in carrying the solids. The temperature obtained by burning can vary over the range of about 600° to 1500° F. or higher. As another alternative, the elongated confined zone may merely serve as a carrying zone for the solids and all of the generation of heat is accomplished in a separate zone below and/or above the elongated confined zone; or still another alternative is to generate part of the heat in the elongated confined zone and the remainder in a separate zone which is situated above and/or below the confined zone.

The elongated confined zone which contains solids being carried upwardly, may or may not be surrounded by a second elongated confined zone. The solids being carried upwardly are then circulated into what is hereafter referred to as a "surrounding zone." The surrounding zone may or may not be essentially the same length as the inner elongated zone and may vary considerably in cross-sectional area depending on the heating and flow requirements of the system. The combination of the two zones provides a countercurrent flow of solids, in which the outer zone contains solids flowing downwardly in an elongated confined zone indirectly contacting the mass of solids to be heated. The unusual advantage in providing a surrounding zone for the stream of upward flowing solids is that any breakthrough of materials from the inner elongated confined zone will not result in a mixing with the materials being heated.

The outer surrounding zone, described above, and the inner elongated confined zone may constitute the entire system and be, for example, imbedded or submerged in a mass of solids to be heated. Another aspect of my invention is to have a plurality of elongated confined zones in which the heated solids pass downwardly through indirect exchange of heat.

My system for transferring heat can be conducted with (a) dense phase downward flowing solids and lean phase upward flowing solids, (b) dense phase upward flowing solids and dense phase downward flowing solids, and (c) lean phase upward flowing and lean phase downward flowing solids.

Ordinarily, it is sufficient to employ a single elongated confined zone for passing solids upwardly in either a dense or lean phase. In one particular situation substantially all of the heat to be exchanged indirectly with another mass of solids is generated prior to leaving the single confined zone. This method is advantageous from the standpoint that heating and transportation of solids is effected before leaving the confined zone, and the task of adequately distributing the solids for indirect heat exchange with the solids being heated is performed in a separate zone.

A specific embodiment of my invention will be described with reference to the hydroforming process, however, it should be understood that no undue limitations or restrictions on the scope of my invention should be imposed by reason thereof.

Hydroforming is a catalytic reforming process for petroleum naphtha stocks which process is accomplished in the presence of hydrogen and under other conditions so as to produce substantial amounts of aromatic compounds. The hydroforming reaction involves chiefly a dehydrogenation reaction of naphthenic compounds to form aromatics. To a lesser extent, the aliphatic hydrocarbons of at least 6 carbon atoms are cyclized and dehydrogenated to produce aromatic compounds; and 5 carbon atom ring compounds are converted to aromatic compounds. Hydroforming is therefore a very effective method of producing a highly aromatic hydrocarbon stock or is essentially a reforming operation for petroleum fractions to enrich the aromatic content.

In the hydroforming process various catalysts may be used depending upon the results desired. Generally, the catalysts include metals of groups 4, 5 and 6 of the periodic system, preferably in the form of oxides. Specific examples of metals which have been used in the hydroforming process of chromium, molybdenum, tungsten, titanium, cerium, thorium, etc. These metals are used as such or in the form of oxides; and can also be used alone or on various supports, such as for example, alumina, magnesia, silica or combinations of the foregoing, such as silica-alumina, silica-magnesia, etc. A very effective catalyst is molybdenum oxide impregnated on "activated alumina" or alumina gel in the mount of about 1 to 40% based on the weight of the total catalyst. More usually, for commercial operations, the amount of molybdenum oxide on the alumina carrier is about 2 to 10% by weight. Another very effective hydroforming catalyst is platinum supported on alumina.

A description of the amount and type of contacting between the hydroforming catalyst and reactant feed is conveniently expressed by the space velocity which is the oil feed rate in pounds per hour per pound of catalyst in the reaction zone. For the hydroforming reaction generally, the space velocity is about .05 to 20, preferably about 0.1 to 10. The temperature at which the hydroforming reaction occurs is about 850° F., preferably about 920° F. and up to about 1100° F. or higher.

The pressure range in which the hydroforming reaction is carried out is about 30 to 1000 pounds per square inch gauge, preferably about 100 to 400 pounds per square inch gauge. The type of catalyst used is of greatest importance in establishing the operating pressure. The ratio of hydrogen used is conveniently defined as the number of standard cubic feet per barrel of oil feed. Generally, this ratio is about 500 to 10,000, preferably about 1000 to 4000.

The application of my invention to the hydroforming process is further illustrated by means of the annexed drawings which form a part of this specification.

Figure 2:
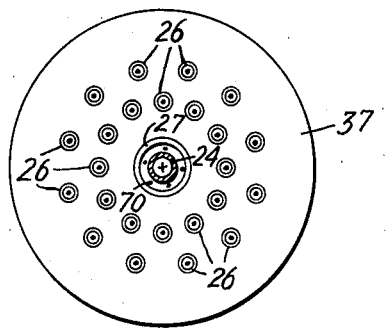

In the drawings:

Figure 1 is a combination of regenerator and reactor for the hydroforming process, whereby the heat of combustion is indirectly exchanged with the solids in the reaction zone; and Figure 2 is a plan view of the arrangement of tubes in tube sheet 37, which tubes serve as the elongated confined zones for passage of solids.

In Figure 1, reactor 6 is a cylindrical vessel which contains a fluidized mass of catalytic solids having particle sizes of about 0 to 150 microns and having a level represented as line 7. The fluidized mass may have a density in order of about 20 to 60 pounds per cubic foot. The catalyst employed is, for example, about 9% to molybdenum oxide supported on alumina. A weir 9 forms a segmental stripping well 10 at one side of the reaction vessel. Inside stripping well 10, a stripping fluid distributor 11 is situated. The level of fluidized catalyst in the stripping well is usually at a point lower than the level in the reaction zone, and in Figure 1 it is represented by a line 12. The stripping gas entering zone 10 through distributor 11 can be steam, flue gas, nitrogen, carbon dioxide, hydrogen-containing gas, or light hydrocarbon, etc. The amount of gas thus introduced is about .25 to 5.0, preferably about 1.0 to 2.0, cubic feet per cubic foot of catalyst entering the stripping zone from the reaction zone, measured at reaction conditions.

Element 13 is a grid plate in the bottom section of reaction zone 14 covering the available cross-sectional area of the reaction zone and providing passage for materials therethrough. The grid plate contains openings of reduced area so that recycle gas containing hydrogen, which is introduced through line 15, will be uniformly distributed across the cross-section of the reaction bed. This is accomplished by designing the grid plate to cause a pressure drop of about 0.1 to 1.0 p. s. i., preferably about 0.5 to 1.0 p. s. i., when gases pass therethrough. Ordinarily, it is desirable to provide openings of sufficient size so that gases passing therethrough will have linear velocities in the order of about 60 to 150 feet per second. Hydrocarbon feed is introduced into the reaction zone 14 above grid plate 13 through line 16. The oil feed is distributed uniformly across the bed of catalyst by means of distributor 17, which is circular in shape and contains perforations. The reactant gas or gases passing through reaction zone 14 are generally at a superficial linear gas velocity of about 0.3 to 3.0, preferably about 0.7 to 1.5, feet per second. At these velocities, the reaction product leaving the reaction zone contains some entrained catalyst particles. The solid material is separated from the gaseous product in separator 17a, and the separated solids are returned to the fluidized bed through return line or dipleg 18, whereas the separated gaseous product leaves the system through line 19 to suitable product fractionating and recovery equipment not shown. Further cleanup of the last traces of catalyst entrainment may be effected in the recovery equipment by means of oil scrubbing or by use of filters, the catalyst thus recovered being returned to the reactor as a slurry of catalyst in oil through line 20.

In the reaction zone, the catalyst particles are temporarily deactivated by the deposition of carbonaceous material and/or other contaminants. The carbonaceous material is composed of carbon and hydrocarbons of a high carbon to hydrogen ratio. Further, the particles may contain adsorbed and/or absorbed volatile carbonaceous material and/or occluded volatile material. These materials are all or partly separated from the solids in the stripping zone. The stripped catalyst leaves the stripping zone through line 21 which contains a control valve 22 and enters zone 23. Zone 23 is a mixing zone from which catalyst is carried upwardly through regenerator riser or elongated confined zone 24. Just below riser 24, and in a coaxial arrangement therewith, is gas inlet 25, which is a fixed conduit in relation to riser 24. Alternatively, the fixed conduit can be plug valve of the movable type which is moved up and down in relation to riser 24 in order to regulate catalyst flow upwardly. Regenerating gas or oxygen-containing gas passes upward from conduit 25 and enters riser 24, carrying therewith catalyst which is present in the mixing zone 23. The rate of catalyst flowing upward in regenerator riser 24 can be regulated by varying the rate of gas flow through conduit 25.

Inside zone 23, spent catalyst is mixed with regenerated catalyst which is flowing downwardly from elongated confined zones or heat exchange tubes 26 and 27. The regenerated catalyst entering the mixing zone from tubes 26 and 27, may be substantially free of carbonaceous deposits or contain, on the average, as high as 4 or 5% of such deposits; whereas the spent catalyst contains about 0.5 to 8.0%, preferably about 3.0 to 5.00%, of carbonaceous material, based on the weight of total catalyst. The relative weight rates of regenerated catalyst and spent catalyst entering zone 23 can be in the ratio of about 2 to 40:1, preferably about 10 to 20:1, of the former to the latter. The volume of mixing zone 23 should be sufficient to receive regenerated catalyst and spent catalyst and provide enough holdup so that the two streams can mix thoroughly before leaving. In the bottom of zone 23, aeration gases are introduced under grid plate 28 through line 29 in order to maintain the catalyst in zone 23 in a fluidized state. The amount of aeration gases introduced through line 29 is sufficient to produce a superficial velocity of from 0.3 to 1.0 feet per second in zone 23. Oxygen-containing gas is introduced through conduit 25 in a sufficient quantity to carry the required amount of catalyst upward through regenerator tube 24 and to burn all or part of the carbonaceous material on the spent catalyst. Alternately, if desired, the oxygen-containing gas may be diluted with an inert gas, such as steam, carbon dioxide, nitrogen, etc., when the amount of regeneration is small as compared to the lifting duty of the gas, in order that the use of an oxygen-containing gas is minimized. Catalyst may be withdrawn from or added to the reaction zone 14 through line 30 which communicates with the bottom part of mixing zone 23 above grid 28.

Catalyst flowing upwardly through regeneration tube 24 may be either a lean or dense phase and, hence, the density of the catalyst mixture in this tube may vary between wide limits. Normally, it is preferred to have a density of about 10 to 14 pounds per cubic foot, in order that intimate contact is obtained between regenerated solids and spent solids to facilitate heat exchange therebetween and avoid local overheating. Usually, it is preferred to use a dense phase whenever possible in tube 24 to avoid the undesirable local overheating just described. The carrying and/or regenerating gases may have a superficial linear velocity of about 5 to 50 feet per second, whereas the catalyst rate at these gas velocities will be from about 20 to 400 pounds per second per square foot of cross-sectional area of tube 24, preferably about 50 to 200 pounds per second. The temperature in this tube 24 can be from about 580° to 1200° F., preferably about 1050° to 1150° F. Generally, the pressure drop across regenerator tube 24 will vary with the length required for a given installation and the density of the material in the tube.

Mixing zone 23 is separated from reaction zone 14 by means of walls 35 which surround the mixing zone and plate 36 which is disposed about the zone in a horizontal plane. Plate 36 forms a tube sheet in which tubes 26 and 27 are fixed in a manner to permit flow of material from tubes 26 and 27 into zone 23, while at the same time preventing flow of material from mixing zone 23 into reaction zone 14 or vice versa. Regenerator tube 24 and tube 27 are concentrically disposed with respect to each other. Tube 27 is supported in plate 36 at the bottom end and by means of plate 37 at the upper end thereof. This upper plate 37 of tube 27 also prevents material flow from the overhead zone 44 into the reaction zone 14. The lower end of regenerator tube 24 may be positioned within tube 27 as shown by guide vanes 38.

The upper end of regenerator tube 24 joins an enlarged zone 39. This zone provides an enlarged cross-sectional area so that the superficial linear gas velocities are greatly reduced after leaving the regenerator tube. Ordinarily, the ratio of the cross-sectional area of zone 39 to cross-sectional area of regenerator tube is about 10 to 50:1, thus causing the linear gas velocities to decrease to about 0.2 to 3.0 feet per second, preferably about 0.5 to 1.0 foot per second. Under these conditions, the catalyst in the zone will be a dense phase. The catalyst in this zone 39 may be composed of suitably regenerated catalytic particles by virtue of complete regeneration in tube 24, or the catalyst entering this zone may be incompletely regenerated. In the latter event, additional oxygen-containing gas may be introduced via line 40 at the bottom of zone 39 in sufficient quantity to oxidize the residual carbonaceous material entering the zone. The temperature of the catalyst in this zone may range between about 1000° to 1200° F., or in the case of hydroforming, more usually, between about 1050° and 1150° F.

Within the bottom part of zone 39 is situated a grid plate 41 which is above the point of entry of oxygen-containing gas through line 40. This grid plate serves to effect a uniform distribution of oxygen-containing gas, as well as catalyst and gas from tube 24 over the cross-sectional area of the zone. Zone 39 consists of a concentric cylinder within an enlarged cylindrical vessel portion 45 which is superimposed upon the reaction vessel. The cross-section of this vessel provides a disengaging zone for separation of regeneration product gases from catalyst and is reduced in area near the bottom end of zone 39. Within zone 39 is situated a segmental portion of well 46 which is formed by a vertical transverse baffle 47. Catalyst is returned to the reaction zone via line 48 which contains a control valve 49 for automatically regulating the flow of catalyst. Suitable aeration gases may be introduced into standpipe 48 through suitably located lines 50 in order to insure fluidization of the catalyst. The portion of catalyst which is not circulated to the reaction zone flows over the sides of zone 39 into the annulus 54 which is formed between zone 39 and vessel 45. In the disengaging zone, the gases are separated from the solids and then pass overhead through separator 55 which can be a cyclone or other suitable separating means. Any entrained solids are separated and returned to the catalyst bed in zone 39 by means of dipleg 56, whereas the separated gases leave the system through line 58.

In the drawing, the level of catalyst in annulus 54 is shown by line 59. The density of this catalyst is essentially the same as that existing in tubes 26 and 27. Aeration gases may be introduced into the catalyst bed in the annulus through line 60 in order to insure fluidization and afford a means of controlling density. The continuous column of catalyst from level 59 through tubes 26 and 27 to conduit 25 exerts a fluistatic pressure having its greatest magnitude at the conduit 25. The fluistatic pressure thus developed being greater than that developed in the regenerator tube 24 creates a flow of catalyst from zone 23 into tube 24. Therefore, gas introduced into riser 24 at a predetermined rate will produce a density in riser 24 below that in the tubes 26 and 27, and will induce the desired upward flow of catalyst through the riser.

For improved performance of this invention, it is desirable to have some lateral flow of catalyst in the reaction zone. In this way, the heat transfer from tubes 26 and 27 to the catalyst in the reaction zone will be more effective and local overheating will be avoided. To accomplish this purpose, one or more perforated baffles 61 extend from the walls of vessel 6 at suitable positions in the catalyst bed so that at least some catalyst will circulate around these baffles and pass between the tubes.

The temperature of the system will be such that the various metallic parts of the equipment will undergo different degrees of expansion. With regard to the bank of tubes 26 and 27, an expansion joint 64 is present in the section just above plate 37 to offset the differential expansion between the tubes 26 and 27 and the cooler walls of the reaction vessel 6. A grid plate covers the annular space of the reaction zone surrounding the bundle of tubes 26 and 27 at the bottom of the straight side portion of vessel 6. The horizontal portion of the grid is disposed above lower tube sheet 36, and a portion of the grid depends vertically and is sealed to the face of plate 36. To avoid any catalyst from settling permanently on plate 36, gas flows into the reaction zone through openings 66 in the vertical sections of the grid plate.

In Fig. 1, the level 59 in the annulus 54 is shown at a position which will produce the highest rates of catalyst flow for a given catalyst density and gas rate through regenerator tube 24. However, it should be understood that this operation can be modified so that the level can be dropped to any point within the bank of tubes 26 and 27 or even into mixing zone 23 consistent with satisfactory catalyst flow. If the catalyst level within tubes 26 and 27 is not dropped below the level of catalyst in the reaction zone, the heat exchange is essentially with a dense phase. If the level within tubes 26 and 27 is maintained at any point between the level of catalyst in the reactor and plate 36, the operation involves heat transfer from both a lean and dense phase to the bed of catalyst in the reactor. If the level within tubes 26 and 27 is located below plate 36, heat transfer is from a lean phase to the catalyst bed. Depending on the heat requirements of the operation in question, any one of the foregoing conditions of heat transfer can be used. However, a dense phase operation is to be preferred because of heat transfer and fluid flow considerations.

The process and apparatus shown in Figure 1 can be modified to suit other situations in which the heating requirements differ from those of the hydroforming process just described. For example, in an operation such as fluid catalytic cracking where the rate of carbonaceous material deposited on catalyst is substantially greater than in a hydroforming operation, it may be desirable to modify the apparatus and process whereby practically all of the carbonaceous material to be burned is effected in a large zone superimposed above but connected with regenerator tube 24 of Figure 1. Under these conditions, the catalyst holdup will be increased substantially over that of the regeneration system of Figure 1.

Another modification which is suitable for systems requiring relatively moderate amounts of heat for the intended reaction is to employ a single regenerator tube 24 and a single return tube 27 which is concentrically disposed therewith. If the heating surface is inadequate, this can be improved by installing fins along the length of the outside of tube 27 or plates in transverse planes to the lateral surface of tube 27. In either case a substantial increase in heating surface is accomplished.

Another modification for removing catalyst from the reaction zone is to convey the catalyst upwardly in a conduit from any point in the fluid bed by means of steam or other stripping gas to a point of higher elevation above the reactor bed level, at which point the catalyst and stripping gases are substantially separated, and the separated catalyst is fed into the stripping zone. An effective separating means for this purpose is a cyclone separator. By this modification, a stripping operation is effected through lifting the catalyst from the reactor bed by means of the gaseous or vapor stripping medium.

In the operation of my invention, the regenerated catalyst may be returned to the reaction zone at a point near the top of the catalyst bed and the spent catalyst may be withdrawn at a point near the bottom of the bed so that the net flow of catalyst is generally in a downwardly direction. The series of tubes shown in Figure 1 contain regenerator tube 24 in the center position as will more fully be explained hereafter in connection with Figure 2. However, it should be understood that regenerator tube 24, with or without the concentric tube 27, can be offset from the bank of tubes 26. Various suitable modifications can be made so that the method and apparatus of my invention will satisfy particular needs for a variety of situations.

Figure 2 is a top view of the bank of tubes shown in Figure 1 looking down from above plate 37, at section 2—2'. In this figure, regenerator tube 24 is in the center of the bundle of tubes and outer tube 27 is concentrically disposed with relation thereto. The remainder of the tubes shown in this figure correspond to tubes 26 which appear in Figure 1. Each tube is marked by a "dot" or a "cross"; an upward direction of flow is indicated by a cross while a downward direction of flow is shown by a dot. It can be seen therefore, that regenerator tube 24 is not in contact with the bed of catalyst in the reactor, but instead is surrounded by catalyst flowing through the annulus 70 which is formed between tube 27 and regenerator tube 24. The arrangement of tubes 26 can be such that catalyst flowing in a lateral direction thereto will not channel so as to reduce the efficiency of heat transfer. This can be accomplished by staggering tubes 26 so that catalyst flowing through a bundle thereof will impinge against at least one or more tubes. A major advantage is gained by locating the regenerator tube 24 within the larger tube 27 and having catalyst flow in the annular space formed therebetween, since a rupture in the wall of tube 24, due to erosion, etc., will not cause any undesirable mixing of oxygen-containing gas from the regeneration zone with hydrocarbon vapors in the reaction zone. This type of tube arrangement constitutes a safety feature which makes possible the employment of high linear velocities of gases through tube 24 and eliminates the danger which may result from tube eruption due to erosion.

Having thus described my invention, it should be understood that no undue limitations or restrictions should be imposed by reason of the specific illustrations given, and that various modifications as to size and shape and position of elements can be resorted to without departing from the spirit and scope of my invention.

I claim:

1. A process for transferring heat to a mass of finely divided solids which comprises a zone containing a dense fluidized mass of finely divided solids to be heated, passing a mass of finely divided solids containing combustible material upwardly in an elongated confined zone wherein the combustible material is burned with an oxygen-containing gas and an elevated temperature is thereby attained, and then circulating said heated solids as a dense phase downwardly in an elongated confined zone which surrounds the first named elongated zone and indirectly transfers heat to the dense phase of solids to be heated in the first named zone which surrounds the second named elongated zone.

2. A process for transferring heat to a mass of finely divided solids which comprises a zone containing a dense fluidized mass of finely divided solids to be heated, passing a mass of finely divided solids containing combustible material upwardly in an elongated confined zone, passing said upwardly moving solids into an upper combustion zone wherein the combustible material is burned with an oxygen-containing gas and the solids attain an elevated temperature, and then circulating said heated solids downwardly in another elongated confined zone which surrounds the first named elongated zone and indirectly transfers heat to the dense phase of solids to be heated in the first named zone which surrounds the second named elongated zone.

3. A process for transferring heat to a mass of finely divided solids which comprises a zone containing a dense fluidized mass of finely divided solids to be heated, passing a mass of finely divided solids containing combustible material upwardly in an elongated confined zone wherein at least a portion of said combustible material is burned with an oxygen-containing gas to heat the solids, and then circulating said heated solids downwardly in a plurality of elongated confined zones as a dense phase, one of such elongated zones surrounding the elongated zone in which solids are carried upwardly, and the said elongated zones containing downwardly flowing solids which indirectly transfer heat to the dense phase of solids to be heated in the first named zone which contains the solids to be heated surrounding the plurality of elongated zones.

4. In a chemical process wherein a gaseous reactant is contacted with a mass of finely divided catalytic solids situated as a dense phase in a reaction zone thus producing a desired reaction product and a combustible deposit on said catalyst; the steps including the withdrawal of at least a portion of said catalyst in the reaction zone, contacting the withdrawn catalyst with a stripping gas in a stripping zone, transferring the stripped catalyst to a mixing zone, mixing said catalyst with a mass of catalyst containing less combustible material, passing the catalyst mixture upwardly in an elongated zone wherein at least a portion of said combustible deposit is burned with an oxygen-containing gas and the catalyst is thus heated, circulating at least a portion of the heated catalyst as a dense phase downwardly through an elongated zone which surrounds the first mentioned elongated zone and indirectly transfers heat to the mass of solids to be heated in the reaction zone, and passing a portion of the heated catalyst to the aforesaid reaction zone.

5. In a hydrocarbon conversion process wherein a gaseous reactant is contacted with a dense bed of finely divided catalytic solids in the reaction zone thereby producing a desired product and resulting in a combustible material being deposited on said catalyst; the steps including the withdrawal of at least a portion of the catalyst in the reaction zone, contacting the withdrawn catalyst with a stripping gas in a stripping zone, transferring the stripped catalyst to a mixing zone, mixing said catalyst with a mass of catalyst containing less combustible material, passing the mixture of catalyst upwardly in an elongated zone wherein at least a portion of the combustible material is burned and the catalyst is thus heated to a temperature above the temperature of catalyst in the reaction zone, passing at least part of the heated catalyst downwardly as a dense phase through a plurality of elongated confined zones, one of said elongated zones surrounds the elongated zone wherein catalyst flows upwardly, all of said elongated zones containing downwardly flowing heated catalyst which indirectly transfers heat to the dense bed of catalyst in the reaction zone, and circulating a portion of the heated catalyst to the reaction zone.

6. In a hydrocarbon conversion process wherein a gaseous reactant is contacted with a dense bed of finely divided catalytic solids in a reaction zone thereby producing a desired product and resulting in a carbonaceous material being deposited on said catalyst; the steps including the withdrawal of at least a portion of the catalyst in the reaction zone, contacting the withdrawn catalyst with a stripping gas in a stripping zone, transferring the stripped catalyst to a mixing zone, mixing said catalyst with a mass of catalyst containing less carbonaceous material in a mixing zone, passing the mixture of catalyst upwardly in an elongated zone wherein at least part of the carbonaceous material is burned and the catalyst is heated to a temperature above the temperature of the catalyst in the reaction zone, passing at least part of said heated catalyst downwardly as a dense phase through a plurality of elongated confined zones, one of which surrounds the zone in which catalyst flows upwardly, all of the zones containing downwardly flowing heated catalyst which indirectly transfers heat to the dense bed of catalyst in the reaction zone, circulating a portion of the heated catalyst to the reaction zone, and passing the downwardly flowing catalyst to the mixing zone.

7. An apparatus for chemical conversion which comprises a reaction vessel, a vertical upflow elongated conduit situated within said reaction vessel and adapted for upward flow of finely divided solids, a surrounding conduit wherein is disposed said upflow elongated conduit thus forming an annulus for downward flow of finely divided solids, means whereby solids flowing upwardly are passed to said annulus for downward flow, means whereby downwardly flowing solids are passed to the upflow elongated conduit for upward flow, means whereby solids are withdrawn from said reaction vessel and passed upwardly in said elongated conduit, and means whereby solids are re-circulated to said reaction vessel.

8. An apparatus for a hydrocarbon conversion process comprising a reactor means containing a bed of finely divided catalytic solids, an upflow elongated conduit situated within said reactor means and sealed therefrom, a plurality of downward flow elongated conduits one of which surrounds the upflow conduit and provides an annulus for downwardly flowing solids, means whereby solids are withdrawn from said reactor means and passed to said upflow elongated conduit, means whereby solids are passed from said upflow elongated conduit to said downflow elongated conduits and annulus, means for re-circulating solids to said reactor means, and means whereby solids leaving the downflow elongated conduits and annulus are re-circulated to the upflow elongated conduit.

9. A process wherein a gaseous material is contacted with a heated mass of finely divided solids in the first zone, the steps including the withdrawal of at least a portion of the solids in the first zone, mixing the withdrawn solids with another mass of finely divided solids, passing the combined masses of finely divided solids upwardly in an elongated confined zone, imparting heat to the combined solids such that the temperature thereof is greater than the temperature of the solids in the first zone, passing at least a portion of heated combined solids downwardly through a second elongated confined zone which surrounds the first mentioned elongated zone and indirectly transfers heat to the solids in the first zone, and passing a portion of the heated combined solids to the first zone.

10. A chemical process wherein a gaseous reactant is contacted with a dense fluidized bed of finely divided catalytic solids in a reaction zone thus producing a desired product and resulting in a combustible material being deposited on the catalyst; the steps including the withdrawal of at least a portion of the catalyst in the reaction zone, mixing the catalyst thus withdrawn with a mass of finely divided catalytic solids containing less combustible material, passing the combined masses of catalyst upwardly in an elongated confined zone, passing the combined mass of catalyst from the elongated confined zone to a regeneration zone wherein at least part of the combustible material is burned with an oxygen containing gas thus heating the catalyst to a temperature substantially greater than the temperature of the catalyst in the reaction zone, passing at least a part of the heated catalyst downwardly through a second elongated confined zone which surrounds the first mentioned elongated confined zone and indirectly transfers heat to the mass of catalyst in the reaction zone, and passing a portion of the heated catalyst to the reaction zone.

11. A hydroforming process wherein a petroleum naphtha is contacted with a dense fluidized mass of finely divided reforming catalytic solids in the presence of hydrogen in a reaction zone thus producing a reformed product and resulting in the deposition of carbonaceous material on the catalyst; the steps including the withdrawal of at least a portion of catalyst in the reaction zone, mixing the withdrawn catalyst with catalyst of less carbonaceous content in a mixing zone, passing the mixture of catalysts upwardly in an elongated confined zone by means of an oxygen containing gas whereby at least a portion of the carbonaceous material is removed by burning, passing the catalyst from the elongated confined zone to a regeneration zone wherein the catalyst is further contacted with oxygen containing gas so that the temperature of the catalyst is substantially greater than the temperature of the catalyst in the reaction zone, passing a portion of the heated catalyst downwardly through a plurality of elongated confined zones, one of which surrounds the first mentioned elongated confined zone wherein catalyst passes upwardly, the downwardly passing heated catalyst indirectly transfers heat to the catalyst in the reaction zone, and passing catalyst from the regeneration zone to the reaction zone.

12. A process which comprises an endothermic zone containing a mass of finely divided solids to be heated, passing a mass of finely divided solids in a first elongated confined zone, imparting heat to said solids, and passing said heated solids at a temperature greater than the temperature of the endothermic zone downwardly in a second elongated confined zone which surrounds the first elongated zone and thus transferring heat indirectly to the endothermic zone which surrounds the second elongated confined zone.

13. The process of claim 12 wherein the solids in the first zone and the second elongated confined zone are present as a dense fluidized mass.

14. An apparatus for a hydrocarbon conversion process which comprises a vertical cylindrical reaction vessel adapted to contain a fluidized bed of finely divided catalytic solids, an upflow elongated conduit situated within said reaction vessel and sealed therefrom, a vertical cylindrical regeneration vessel situated above said reaction vessel and communicating with said upflow elongated conduit, a plurality of downflow elongated conduits one of which surrounds the upflow conduit and provides an annulus for downwardly flowing solids and which downflow conduits communicate with said regeneration vessel, means whereby solids are withdrawn from the reaction vessel and passed to the upflow elongated conduit, means for passing solids directly from the regeneration vessel to the reaction vessel, and means whereby solids are passed from the plurality of downflow conduits to the upflow elongated conduit.

15. An apparatus for hydrocarbon conversion process comprising a vertical cylindrical reaction vesesel having a reaction section and a stripping section and adapted to contain a fluidized bed of finely divided catalytic solids, an upflow elongated conduit situated within the reaction vessel and sealed therefrom, a vertical cylindrical regeneration vessel separated from said reaction vessel and communicating with said upflow conduit, a plurality of downflow elongated conduits situated within said reaction vessel and communicating with said regeneration vessel, one of said downflow conduits surrounding the upflow conduit and thus providing an annulus for downwardly flowing solids, a vertical cylindrical mixing vessel communicating with said stripping section and with said upflow and downflow conduits opposite to said regeneration vessel and being separated from said reaction vessel, means for passing solids directly from the regeneration vessel to the reaction vessel, and means for passing catalyst from the reaction vessel to the mixing vessel.

References Cited in the file of this patent

UNITED STATES PATENTS

| | | |
|---|---|---|
| 2,363,874 | Krebs | Nov. 28, 1944 |
| 2,378,342 | Voorhees et al. | June 12, 1945 |
| 2,432,298 | Eastwood et al. | Dec. 9, 1947 |
| 2,447,043 | Welty | Aug. 17, 1948 |
| 2,450,753 | Guyer | Oct. 5, 1948 |
| 2,451,619 | Hengstebeck | Oct. 19, 1948 |
| 2,514,488 | Nicholson | July 4, 1950 |
| 2,550,922 | Gullette | May 1, 1951 |
| 2,697,686 | Leffer | Dec. 21, 1954 |